(12) United States Patent
Kulmann et al.

(10) Patent No.: US 6,953,055 B2
(45) Date of Patent: Oct. 11, 2005

(54) PNEUMATIC GATE VALVE WITH AN INJECTION-MOLDED VALVE HOUSING

(75) Inventors: Erwin Kulmann, Stuttgart (DE); Klaus Bergmann, Stuttgart (DE)

(73) Assignee: Bosch Rexroth AG, Schwieberdingen (DE)

( * ) Notice: Subject to any disclaimer, the term of this patent is extended or adjusted under 35 U.S.C. 154(b) by 295 days.

(21) Appl. No.: 10/395,717

(22) Filed: Mar. 24, 2003

(65) Prior Publication Data

US 2003/0217776 A1 Nov. 27, 2003

(30) Foreign Application Priority Data

Mar. 25, 2002 (DE) .......................................... 102 13 258

(51) Int. Cl.[7] .......................................... F16K 11/065
(52) U.S. Cl. .......................... 137/625.27; 137/625.69; 251/359; 251/368
(58) Field of Search ....................... 137/625.27, 625.69; 251/359, 368

(56) References Cited

U.S. PATENT DOCUMENTS

| | | | | | |
|---|---|---|---|---|---|
| 2,910,081 | A | * | 10/1959 | Karbowniczek | ....... 137/625.68 |
| 2,938,704 | A | * | 5/1960 | Quail | ......................... 251/368 |
| 3,329,165 | A | * | 7/1967 | Lang | ...................... 137/625.5 |
| 3,580,286 | A | * | 5/1971 | Bash | .......................... 251/368 |
| 3,884,266 | A | * | 5/1975 | Kondo | .................. 137/625.27 |
| 3,951,166 | A | * | 4/1976 | Whitener | ............... 137/625.27 |
| 3,952,996 | A | * | 4/1976 | Hart | ...................... 137/625.69 |
| 3,960,166 | A | * | 6/1976 | Linser | .................... 137/625.69 |
| 5,361,803 | A | * | 11/1994 | Stoll | ....................... 137/625.69 |
| 6,834,676 | B2 | * | 12/2004 | Kulmann | ............... 137/625.69 |

FOREIGN PATENT DOCUMENTS

| | | |
|---|---|---|
| DE | 197 45 802 A1 | 4/1999 |
| EP | 0 443 779 A | 8/1991 |
| JP | 10 184967 A | 7/1988 |

* cited by examiner

Primary Examiner—John Rivell
(74) Attorney, Agent, or Firm—Henry M. Feiereisen

(57) ABSTRACT

A pneumatic gate valve includes a valve housing made of injection-molded plastic material and having a plurality of external ports. Received in the valve housing are a plurality of valve bushings disposed in axial-spaced relationship as to define a valve bore and a plurality of pressure fluid compartments in fluid communication with the ports. A slide member for regulating a flow of compressed air between the ports is accommodated in the valve bore of the valve housing and displaceable in axial direction. The valve bushings are made of plastic material with a same melting temperature as the plastic material of the valve housing so as to realize a material union between the valve bushings and the valve housing, when plastic material is molded around the valve bushings during injection molding of the valve housing.

13 Claims, 1 Drawing Sheet

US 6,953,055 B2

PNEUMATIC GATE VALVE WITH AN INJECTION-MOLDED VALVE HOUSING

CROSS-REFERENCES TO RELATED APPLICATIONS

This application claims the priority of German Patent Application, Serial No. 102 13 258.5, filed Mar. 25, 2002, pursuant to 35 U.S.C. 119(a)–(d), the disclosure of which is incorporated herein by reference.

BACKGROUND OF THE INVENTION

The present invention relates, in general, to a pneumatic gate valve, and more particularly to a pneumatic valve gate having a valve housing, which is made of injection-molded plastic material, and a slide member, which is axially movable in a valve bore of the valve housing, for regulating a flow of compressed air between several external ports of the valve housing.

In a pneumatic valve gate of this type, the valve bore is formed by a plurality of valve bushings which are disposed in the interior of the valve housing in axial spaced-apart relationship, thereby defining pressure fluid compartments in fluid communication with the outer ports. The valve housing can be composed of several parts or may be made in single-piece construction. Split valve housings are generally used in order to simplify the installation of components to be accommodated in the valve housing. Usually, the multi-part valve housing is split in a plane of the slide member. After mounting the internal valve components, the housing parts are connected together by a screw connection with interposed seal. Pneumatic gate valves with split valve housing are, however, rather bulky as the contact surface for the seal requires a certain material thickness.

There is an ever increasing demand on the manufacturers to produce pneumatic gate valves of smaller size because the provision of small single valves enables the production of an overall compact valve unit composed of a multiplicity of adjoining single valves. Therefore, the use of a single-piece valve housing is more and more desired as the overall width can hereby significantly be reduced, without causing an excessive decrease in throughflow of pressure fluid. On the other hand, single-part valve housings must be refinished by a complicated material cutting process, after their production through injection molding, especially as far as the interior valve bore for accommodation of the slide member is concerned. The finishing process of the valve bore involves the provision of a particularly smooth surface and the formation of various slanted inlet ramp surfaces and rounded control edges.

German patent publication DE 197 45 802 A1 describes a single-part valve housing including individual, prefabricated valve bushings which form the valve bore and are molded around with plastic material as the valve housing is injection molded. In order to secure the valve bushings in axial direction, each valve bushing is provided on its outer circumference with at least one ring-shaped groove or, at least in predetermined sections, with a ring-shaped bump, to effect a form-fitting engagement with the valve housing, after the valve housing is molded around the valve bushings. The valve bushings, which are made of metallic material, are placed into the injection mold before the injection molding process and held in place at the appropriate positions by rams. After injection molding, the valve bushings are secured in form-fitting relationship with the valve housing.

Although this approach may appear to be sound, practice has shown that when a gate valve of this type is used over an extended period or exposed to extreme temperature fluctuations, a clearance between the valve bushings and the valve housing may form that adversely affects the operation of the gate valve. In extreme situations, the emergence of a gap may lead to an inadvertent flow of pressure fluid between neighboring pressure fluid compartments. To tackle this problem, the arrangement of a sealing element in the form of an O-ring between the valve bushing and the valve housing has been proposed. However, as plastic material is molded around the valve bushings as the valve housing is injection-molded, the sealing elements are pushed out of the intended position so that the valve housing cannot be manufactured at reliable reproducibility.

It would therefore be desirable and advantageous to provide an improved pneumatic gate valve which obviates prior art shortcomings and which is reliable in operation even when subjected to extreme stress, while still allowing a reproducible production of the valve housing on large scale with constant quality.

SUMMARY OF THE INVENTION

According to one aspect of the present invention, a pneumatic gate valve includes a valve housing made of injection-molded plastic material and having a plurality of external ports, a plurality of valve bushings so received in the interior of the valve housing in axial spaced relationship as to define a valve bore and a plurality of pressure fluid compartments in fluid communication with the ports, whereby the ports and the pressure fluid compartments are placed into one-to-one correspondence, a slide member for regulating a flow of compressed air between the ports, wherein the slide member is accommodated in the valve bore of the valve housing for axial displacement, wherein the valve bushings are made of a plastic material having a melting temperature which corresponds to a melting temperature of the plastic material of the valve housing in order to realize a material union between the valve bushings and the valve housing, when plastic material is molded around the valve bushings during injection molding of the valve housing.

The present invention resolves prior art problems by using valve bushings which are positioned in place before injection-molding the single-piece valve housing and made of a plastic that has a same melting temperature as the plastic for the valve housing so as to establish a material-interconnecting engagement between the valve bushings and the valve housing, when the valve housing is injection-molded and the plastic material is molded around the valve bushings. Thus, a novel and inventive connection is realized between the valve bushings and the valve housing. The material union eliminates any possibility of gap formation between the valve bushings and the valve housing and is established directly as plastic is molded around the valve bushings, i.e. in a same process step. A sealing material union can be realized by corresponding the melting temperature of the plastic materials for the components being connected, i.e. the valve bushings and the valve housing. As a consequence, a detachment of the valve bushings from inside the valve housing is effectively precluded. Since the material properties of the plastic for the valve bushings and the valve housing are the same, they have also identical thermal expansion coefficients, so that the connection according to the invention remains unaffected, even when exposed to substantial temperature fluctuations.

According to another feature of the present invention, each of the valve bushings may have an outer surface formed with lug-like or spike-like projections of reduced material thickness for enhancing a material interconnection with the plastic material of the valve housing. As a consequence of their reduced material thickness, these projections reach quickly the melting temperature during the injection molding process so as to effectively realize the desired material union.

Tests have shown that the projections of the valve bushings are preferably tapered at an angle of 25° to 35° so as to ensure a stable form-fitting engagement between the valve bushings and the valve housing in combination with the material union. Construction of the projections of the valve bushings in this particular angle range results in a reliable fusion onto the material surface of the projections as well as in a sufficiently stable configuration, when the valve bushings are exposed to axial stress. The combination of a material union with an additional form-fitting engagement realizes a connection of superior stability.

According to another feature of the present invention, the valve housing, unlike the valve bushings, may be made of reinforced plastic material to ensure a sufficient housing stability, when additional components are attached. An example of a reinforcing material includes glass fiber. Suitably, the valve housing may be made of polyamide (PA) reinforced with up to 60% glass fibers. Likewise, the valve bushings may also be made of polyamide, although not reinforced with glass fibers because otherwise glass fibers, exposed through rubbing, may damage the seal disposed in the area of the slanted inlet ramps and radius between the slide member and the valve bushings.

A valve housing made of glass-fiber reinforced plastic is especially suitable for threaded connection to a corresponding compressed-air distributing base plate of a valve unit. The glass fiber fraction in plastic inhibits creepage, i.e. a slow plastic deformation when subject to compressive stress. The valve housing has at least one through bore for threadably receiving a corresponding fastening screw for securing the valve housing to the compressed-air distributing base plate, whereby the fastening screw is sufficiently dimensioned to withstand pressure of the valve housing.

According to another feature of the present invention, there may be provided at least one pilot valve, which is flanged onto the valve housing by a pin connection for axial displacement of the slide member in a manner of a pilot control. A further attachment part in the form of at least one cover element may be secured for sealing at least one end of the valve bore, whereby the cover element is threadably engaged into the valve housing, suitably by means of self-tapping fastening screws.

According to another feature of the present invention, precisely four single and identical valve bushings are disposed in the valve housing for defining the valve bore to thereby form a 5/2 directional control valve in conjunction with neighboring pressure compartments. Of course, pneumatic gate valves with different directional control functions may be conceivable as well.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
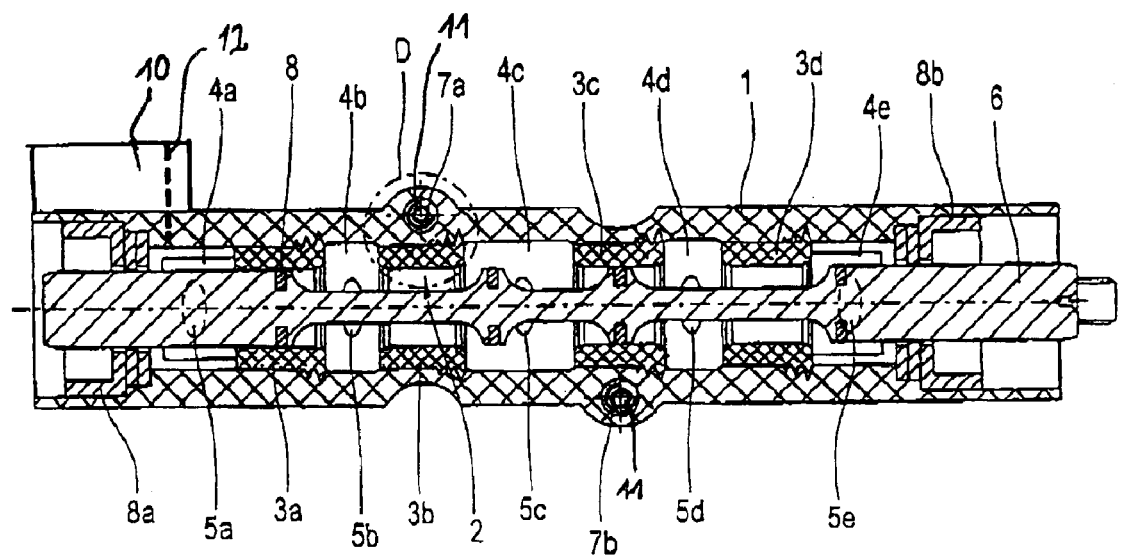
FIG. 1 is a longitudinal section of a pneumatic gate valve according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a longitudinal section of a pneumatic gate valve according to the present invention, including a valve housing 1 which is made of injection-molded glass-fiber reinforced polyamide and includes a valve bore 2 in longitudinal direction. The valve bore 2 is formed by a plurality of valve bushings 3a, 3b, 3c, 3d received in the valve housing 1 in axial spaced-apart disposition, thereby defining on both sides of the valve bushings 3a, 3b, 3c, 3d respective pressure fluid compartments 4a, 4b, 4c, 4d, 4e. The pressure fluid compartments 4a, 4b, 4c, 4d, 4e are in fluid communication with respective external ports 5a, 5b, 5c, 5d, 5e, which are shown here partially obscured. In the non-limiting example of FIG. 1, port 5c serves as central feed pressure port, whereas the neighboring ports 5b, 5d are working ports. The outermost ports 5a, 5e are intended as vent ports. Received in the valve bore 2 for movement in axial direction is a slide member 6 for regulating a flow of compressed air between the ports 5a, 5b, 5c, 5d, 5e. The slide member 6 is axially displaceable via a generally known pilot control by means of a pilot valve (not shown). The valve bore 2 is closed on opposite ends of the valve housing 1 by cover elements 8a, 8b. Several sealing rings 8 are provided on the slide member 6 for sealingly contacting upon the inner wall surface of each valve bushing 3a, 3b, 3c, 3d to thereby form a dynamic seal.

This configuration of the gate valve corresponds to a 5/2 directional control valve. The securement of the valve housing 1 to a compressed-air distributing base plate (not shown) of a valve unit (not shown) is realized by a suitable screw connection. Hereby, the valve housing 1 is provided with two through bores 7a, 7b in diagonally offset disposition for receiving respective screw fasteners (not shown).

The valve housing 1 is made of polyamide reinforced with a fraction of up to 60% glass fibers, preferably 50% glass fibers, whereas the valve bushings 3a, 3b, 3c, 3d are made of non-reinforced polyamide.

Figure 2:
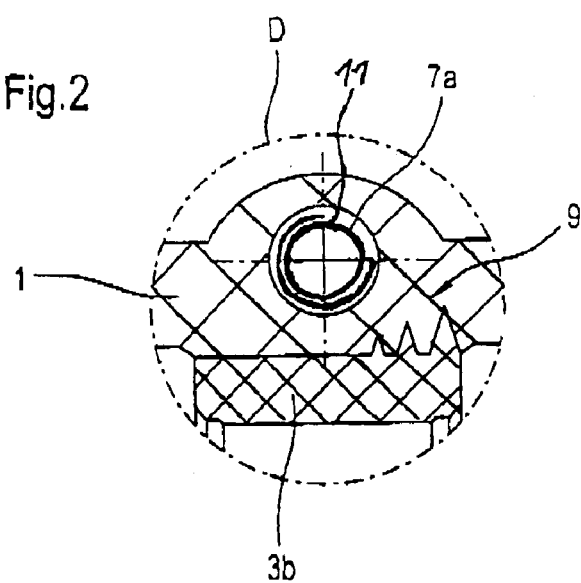
FIG. 2 is an enlarged detailed view of the area encircled in FIG. 1 and marked D in the region of a connection between a valve bushing and valve housing.

Referring now to FIG. 2, there is shown an enlarged detailed view of the area encircled in FIG. 1 and marked D in the region of a connection between valve bushing 3b, depicted here by way of example, and valve housing 1. It will be understood by persons skilled in the art that the depiction of the valve bushing 3b in FIG. 2 is for illustrative purposes only and is equally applicable to the other valve bushings 3a, 3c, 3d. Each of the valve bushings 3a, 3b, 3c, 3d is molded around by plastic material of the valve housing 1, as the valve housing 1 is injection molded. Since same plastic material is used for the valve bushings 3a, 3b, 3c, 3d and the valve housing 1, the melting temperature of the valve bushings 3a, 3b, 3c, 3d is the same as the melting temperature of the valve housing 1. During molding in the injection mold, in which the valve bushings 3a, 3b, 3c, 3d are placed according to a suitable insert technique and then molded around, a material union is established with the valve bushings 3a, 3b, 3c, 3d, as the valve housing 1 is formed as a consequence of a fusion between contacting surfaces.

As shown in FIG. 2, the fusion of the valve bushings 3a, 3b, 3c, 3d can be further improved, when the surface thereof is provided with spike-like projections 9 which taper at an angle of 25° to 35°, preferably 30°. As the projections 9 have a slight wall thickness in the peak area, the material union between the valve bushings 3a, 3b, 3c, 3d and the valve housing 1 is enhanced. In addition, the projections 9, which are disposed radially outwards on the valve bushings 3a, 3b, 3c, 3d, also ensure a stable form-fitting engagement so that the valve bushings 3a, 3b, 3c, 3d can be subjected to a highest degree of stress in axial direction.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated. For example, it is conceivable to configure the gate valve, e.g., as 2/2, 3/2 or 5/3 directional control valve. Also, the use of other appropriate plastics, other than polyamide, are conceivable so long the plastic is applicable for injection molding and realizes a material union between the valve bushings 3a, 3b, 3c, 3d and the valve housing 1.

What is claimed as new and desired to be protected by Letters Patent is set forth in the appended claims and their equivalents:

1. A pneumatic gate valve, comprising:
    a valve housing defining an axis and having an interior, said valve housing made of injection-molded plastic material and having a plurality of external ports;
    a plurality of valve bushings so received in the interior of the valve housing in axial-spaced relationship as to define a valve bore and a plurality of pressure fluid compartments in fluid communication with the ports, whereby the ports and the pressure fluid compartments are placed into one-to-one correspondence;
    a slide member for regulating a flow of compressed air between the ports, said slide member accommodated in the valve bore of the valve housing for displacement in the direction of the axis,
    wherein the valve bushings are made of a plastic material having a melting temperature which corresponds to a melting temperature of the plastic material of the valve housing in order to realize a material union between the valve bushings and the valve housing, when plastic material is molded around the valve bushings during injection molding of the valve housing.

2. The gate valve of claim 1, wherein each of the valve bushings has an outer surface formed with projections of reduced material thickness for enhancing a material union with the plastic material of the valve housing.

3. The gate valve of claim 2, wherein the projections are configured as spikes or lugs.

4. The gate valve of claim 2, wherein the projections of the valve bushings taper at an angle of 25° to 35° so as to ensure a stable form-fitting engagement between the valve bushings and the valve housing in combination with the material union.

5. The gate valve of claim 2, wherein the projections of the valve bushings taper at an angle of about 30°.

6. The gate valve of claim 1, wherein the valve housing, unlike the valve bushings, is made of reinforced plastic material to ensure a sufficient stability, when additional components are attached.

7. The gate valve of claim 6, wherein the reinforced plastic material for the valve housing includes polyamide (PA) reinforced with up to 60% glass fibers.

8. The gate valve of claim 6, wherein the reinforced plastic material for the valve housing includes polyamide (PA) reinforced with 50% glass fibers.

9. The gate valve of claim 1, wherein the valve bushings are made of polyamide.

10. The gate valve of claim 1, wherein the valve housing includes at least one through bore for threadably receiving a corresponding fastening screw for securing the valve housing to a compressed-air distributing base plate.

11. The gate valve of claim 1, and further comprising at least one pilot valve flanged onto the valve housing by a pin connection for axial displacement of the slide member in a manner of a pilot control.

12. The gate valve of claim 1, wherein the valve bore has opposite ends, and further comprising at least one cover element for sealing at least one end of the valve bore, when the cover element is threadably engaged into the valve housing by means of self-tapping fastening screws.

13. The gate valve of claim 1, wherein the plurality of valve bushings is four identical valve bushings for defining the valve bore to thereby form a 5/2 directional control valve in conjunction with neighboring pressure compartments.

* * * * *